Nov. 18, 1969 R. A. HAGGARD 3,478,805
ANIMAL HOUSE CURTAIN AND METHOD OF PREPARING SAME
Filed Feb. 1, 1968

INVENTOR.
RICHARD A. HAGGARD
BY
ATTORNEYS

United States Patent Office 3,478,805
Patented Nov. 18, 1969

3,478,805
ANIMAL HOUSE CURTAIN AND METHOD OF PREPARING SAME
Richard A. Haggard, Nocogdoches, Tex., assignor, by mesne assignments, to U.S. Industries, Inc., New York, N.Y., a corporation of Delaware
Filed Feb. 1, 1968, Ser. No. 702,350
Int. Cl. A47h 23/08
U.S. Cl. 160—5   11 Claims

ABSTRACT OF THE DISCLOSURE

A curtain of the type which is mounted over the sidewall openings in animal and poultry houses and which may be raised and lowered to control the amount of outside air passing into such house, wherein the curtain is made of a sheet material subject to shrinkage upon exposure to sunlight and the elements and is initially made larger than the sidewall opening it is to cover and then gathered by stitching enough to make it fit its intended opening when initially installed. The stitching is done with a thread material which breaks down under the influence of sunlight and the elements, such that as time passes and the curtain shrinks, the gathering stitches break down and release the gathered portion of the curtain; thus, when the shrinkage of the curtain is complete, the gathering will have been completely released, and the curtain will then continue to fit the opening for which it was intended and over which it is mounted.

BACKGROUND

Recent trends in the growing of poultry employ confinement cage assemblies in which a very great number of birds are maintained in a single building. Proper ventilation of such buildings is a matter of critical importance, since the birds will sicken and perhaps die if too little fresh air is provided and the poultry house become too warm; the same result will also occur if excessive drafts are allowed to circulate through the house, or if it becomes too cold.

A very satisfactory and workable system for maintaining proper ventilation in such poultry houses, particularly those which are extremely long, involves the use of long sidewall curtains mounted over similarly lengthy sidewall openings in the houses. These openings often stretch the full length of the house, even though this may be a distance of three hundred feet or more, and often the sidewall openings and curtains are arranged around the entire perimeter of the house, including both sides and both ends as well. Normally, such curtains are mounted by a cable-and-winch arrangement, so that they may be raised and lowered to regulate and control the effective amount of sidewall opening and thereby determine the amount of air allowed to pass into and out of the house.

Shrinkage of these curtains, particularly the extremely long ones, has always posed a troublesome problem in this area, since the shrinkage occurs slowly and over a considerable length of time, and often by the time the shrinkage is complete the curtain will no longer cover the entire sidewall opening for which it was intended. Thus, in such instances a very great percentage of the usefulness and advantage of the curtain, and the entire system of which it was a part, is lost. Furthermore, the problem cannot be resolved with true satisfaction merely by making the curtain oversize in the first instance, although this is to be preferred over the situation wherein the curtains are merely allowed to shrink to a size smaller than the sidewall openings themselves, because if the curtains are made oversize initially they will be very ill-fitting at first and will bag, blouse out, flap, etc. Furthermore, their excess size and their subsequent shrinkage will both adversely affect the operation of the pulley-and-cable suspension system used in mounting the curtains, so that vertical adjustment thereof by lifting and lowering the curtains will be difficult or highly impractical, without any of the required ease and ready facility.

SUMMARY

According to the present invention, a curtain for animal and poultry house sidewall openings is provided, along with a method of preparing such curtain, whereby the curtain is of the proper size to closely cover the sidewall opening when initially mounted thereover, and yet continues to retain this proper size both during and after shrinkage, such that the sidewall openings are properly covered at all such times and the mounting and suspension system may be installed initially with complete confidence that no further difficulties will be encountered and no subsequent adjustments and changes will be necessitated.

The curtain construction of the invention, and the method of preparing the same, involves making the curtain larger initially than the sidewall opening which it is to cover, and the gathering of the curtain material in a relatively small amount by stitching it with thread, using a gathering or bunching type of stitch, such that the extra or oversize portions of the curtain are taken up and its periphery is reduced to closely approximate that of the sidewall opening for which it is intended. Moreover, the stitching is preferably done with a thread such as untreated cotton or polyethylene, which has a low resistance to weathering such that it will break down under the influence of sunlight and the elements, the stitches thus gradually releasing as the thread breaks down, while at the same time the curtain itself is undergoing shrinkage. Thus, as the curtain becomes smaller through shrinkage, its gathered portions are released, such that its periphery remains generally of the same overall size throughout the process of shrinkage, and continues to be of the correct size even after shrinkage is completed.

DRAWINGS

PREFERRED EMBODIMENT

Figure 1:
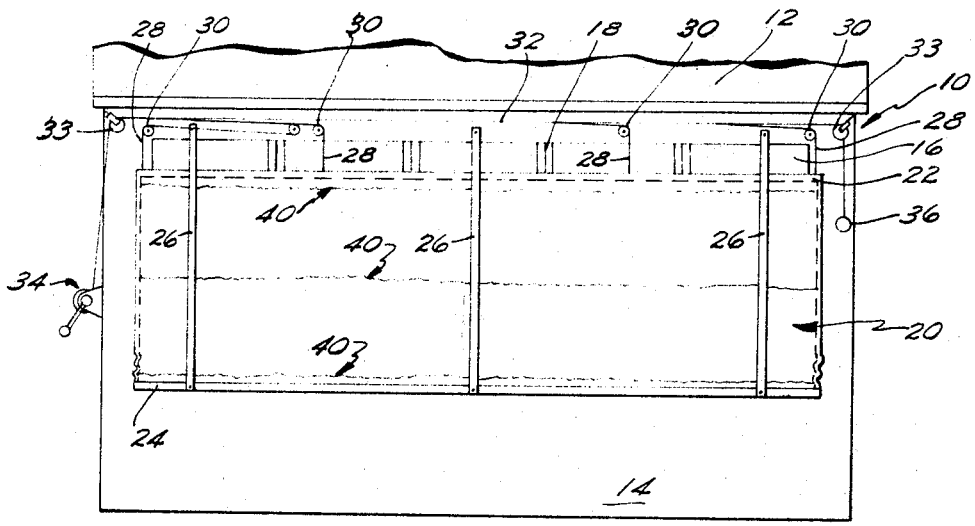
FIG. 1 is a front elevational view showing a typical poultry house with sidewall opening and the curtain of the invention mounted thereover.
Figure 2:
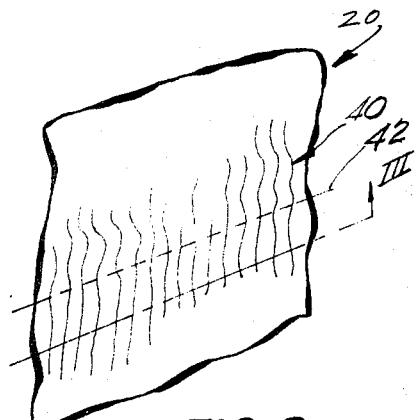
FIG. 2 is an enlarged perspective view of one of the gathered seams in the curtain.

In FIG. 1, a portion of a typical or exemplary poultry house 10 is illustrated, having an overhanging roof 12 and sidewall 14, in which an elongated sidewall opening 16 is formed, normally with a series of vertical dividers 18 which typically provide a structural function in the building of the poultry house.

The curtain construction 20 of the invention is mounted over the sidewall opening 16 in a manner whereby it may be lowered or raised to expose varying amounts of the sidewall opening to the out-of-doors. Preferably, the curtain itself is comprised of an elongated sheet of flexible fabric or the like, preferably a sheet of the synthetic polyvinylidene-chloride material known commercially as "saran," most preferably of the perforate saran which is sold commercially under the trademark "Lumite" by the Chicopee Manufacturing Company, which material is extremely effective as a shield against the elements and is not subject to any significant deterioration merely upon being exposed to sunlight and the elements, aside from a characteristic shrinkage which normally runs in the range of about three percent. The "Lumite" material is preferably hemmed as indicated at 22 along both the top and bottom edges of the curtain, and such hems may also be formed along each vertical side thereof. A strip of wood 24 or the like is preferably attached to the sidewall 14 of the poultry house over the bottom edge of the curtain to secure the curtain to the side of the house in a fixed manner, and vertical suspension members 26, preferably of the same synthetic material of which the curtain itself is made, extend between the wooden hold-down strip 24 and that portion of the sidewall 14 located immediately above the sidewall opening 16.

In accordance with the preferred system for raising and lowering the curtain, the upper edge thereof is weighted, as by a metal rod inserted into the upper hem 22 of the curtain, and the upper edge is suspended by a series of spaced, vertically-oriented cords 28 of nylon or the like which pass around pulley means 30 and interconnect with a horizontally-extending take-up cable 32. This cable is entrained over appropriate end pulleys 33, and one end of it passes over the drum of a manual winch 34 or like take-up device whereas the other end thereof is attached to a counterweight 36.

The curtain construction 20, in addition to the aforementioned features of construction, includes at least one, and preferably a greater number, such as three, elongated seams 40 of stitching, which preferably extend lengthwise of the curtain and along its entire length. Each of these seams comprises a bunching-type stitching which gathers the curtain lengthwise and thereby foreshortens it. The precise amount of foreshortening should be on the order of the anticipated shrinkage of the particular curtain panel involved, which normally may be anticipated with at least moderate accuracy; accordingly, it will be understood that the curtain panel itself is to be initially larger than the size of the sidewall opening 16 by this predicted foreshortening, plus a nominal additional extent incorporating the desired tolerances and safety factors to be considered.

Figure 3:
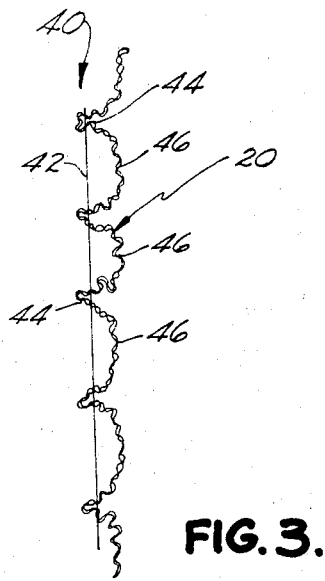
FIG. 3 is a fragmentary, cross-sectional plan view through the horizontal plane III—III of FIG. 2.

The particular type of bunching stitch making up the seams 40 is not felt to be a critical matter, so long as it is a type of stitch which successfully gathers the curtain panel and foreshortens it; however, a typical or exemplary bunching stitch is illustrated in FIG. 3, wherein the thread 42 is seen to secure together each of a series of small folds or pleats 44 in the curtain material, thereby forming a corresponding series of generally arcuate loop portions or bights 46 along the length of the curtain panel. As is well known, many sewing machines now in use, both of the type used commercially as well as the type used in the home, are fully capable of stiching a bunched or gathered seam in this general manner, and it is intended that the seams 40 will in practice be machine-stitched. Further, the precise location and shape of the gathered seams 40 may be varied to suit particular circumstances, and may define, for example, a serpentine or sinuosoidal shape across the panel, as well as various other specific shapes different than the series of mutually spaced essentially linear seams illustrated in FIG. 1, even though these are preferred from the standpoint of simplicity and manufacturing economy.

The thread 42 is preferably of a material which will be adversely affected by sunlight and the elements to which the curtain panel is exposed in usage, such that the thread will weaken and break down under such influence. Untreated cotton has been found to work very satisfactorily for this purpose, and polyethylene thread also will work very well, as indeed will other materials which have as low a resistance to weathering as untreated cotton and polyethylene, the particular choice of which in light of the present disclosure is considered to be well within the skill of the engineer. Consequently, these materials having these characteristics are referred to hereinafter either as natural materials having the characteristics of untreated cotton or as synthetic materials having the characteristics of polyethylene, and these phrases are intended to characterize threads which will weaken and break down when exposed continuously to elemental forces such as sunlight, rain, wind, and the like, or any given combination thereof.

Thus, the method of the invention comprises the foreshortening of a curtain panel which was initially made larger than the sidewall opening it is to cover, by a gathering process which preferably comprises a machine-stitched seam of a bunched or gathered nature. Once properly mounted, the normal shrinkage encountered in the material of which the curtain panel is made (which of course tends to additionally foreshorten the curtain) is approximately compensated for by the gradual breakdown of the thread forming the bunched seam in the curtain panel and the resultant release of the gathered curtain, to in effect allow a lengthening thereof.

I claim:

1. A method of covering sidewall and other such openings in animal and poultry houses by mounting curtains over such openings, wherein such curtains are made of a fabric subject to shrinkage upon exposure to sunlight and the elements, said method comprising the steps: forming a curtain panel for a given such opening by making such panel larger than such opening in at least one corresponding dimension; gathering said curtain panel in its said larger dimension and sewing said gathering with thread which breaks down under the influence of weathering, such gathering being in a manner to foreshorten the curtain to approximately the same size as the said corresponding dimension of said opening; mounting said gathered curtain over said opening; and permitting said thread to break down thereby releasing said gathering to approximately compensate for shrinkage of said panel, such that said panel even after complete shrinkage will will still substantially fully cover such opening.

2. The method of claim 1, wherein said releasing step is carried out gradually.

3. The method of claim 1, wherein said gathering step foreshortens said curtain panel a predetermined amount corresponding to the expectable shrinkage of the panel in said dimension.

4. The method of claim 1, wherein said gathering step comprises the stitching of said panel with a bunching-type stitch.

5. The method of claim 4, wherein said stitching step foreshortens said curtain panel a predetermined amount corresponding to the expectable shrinkage of the panel in said dimension.

6. The method of claim 4, wherein said stitching step includes the making of at least one elongated line of stitching extending substantially across said curtain panel.

7. The method of claim 6, wherein said stitching step includes the making of plural spaced-apart lines of stitching.

8. A curtain construction for covering sidewall and like openings in animal and poultry houses, comprising: a curtain panel made from flexible sheet material which is subject to shrinkage upon exposure to sunlight and the elements; and means for gathering portions of said panel together in a bunching manner; said means including a stitching thread which breaks down under the influence of weathering, whereby said means is releasable to release said gathered portions upon shrinkage of said panel material, to thereby compensate for such shrinkage.

9. The curtain construction of claim 8, wherein said thread material comprises a natural substance having a resistance to weathering which is as low as that of untreated cotton.

10. The curtain construction of claim 8, wherein said thread material comprises a synthetic substance having a resistance to weathering which is as low as that of polyethylene.

11. The curtain construction of claim 8, wherein said curtain panel is of polyvinylidene-chloride material.

References Cited

UNITED STATES PATENTS

| | | | |
|---|---|---|---|
| 2,518,301 | 8/1950 | French et al. | 160—348 X |
| 2,522,358 | 9/1950 | Franson et al. | 160—348 |
| 2,539,244 | 1/1951 | Halden | 112—262 |
| 2,555,155 | 5/1951 | Rubman | 160—348 |
| 2,894,575 | 7/1959 | Kalder | 160—348 X |
| 3,042,001 | 7/1962 | Dubie et al. | 119—21 |
| 3,372,729 | 3/1968 | Lindenmayer | 160—330 |

DAVID J. WILLIAMOWSKY, Primary Examiner
PHILIP C. KANNAN, Assistant Examiner

U.S. Cl. X.R.

119—21; 160—84, 348